United States Patent [19]
Iwano et al.

[11] 4,065,352
[45] Dec. 27, 1977

[54] NUCLEAR FUEL ELEMENT

[75] Inventors: Yoshihiko Iwano; Katsumi Une, both of Yokohama, Japan

[73] Assignee: Tokyo Shibaura Electric Co., Ltd., Kawasaki, Japan

[21] Appl. No.: 694,381

[22] Filed: June 9, 1976

[30] Foreign Application Priority Data
June 13, 1975  Japan ................................ 50-70748

[51] Int. Cl.$^2$ ............................................. G21C 3/02
[52] U.S. Cl. ......................................... 176/68; 176/38; 252/181.3
[58] Field of Search ................. 176/68, 38; 252/181.2, 252/181.3, 181.6; 417/48-51

[56] References Cited
U.S. PATENT DOCUMENTS

| 3,214,245 | 10/1965 | Peters, Jr. ........................... 417/51 X |
| 3,899,392 | 8/1975 | Grossman et al. .................... 176/68 |
| 3,949,460 | 4/1976 | della Porta et al. ................. 176/68 X |
| 3,953,755 | 4/1976 | Kuus et al. .......................... 417/48 X |
| 3,988,075 | 10/1976 | Penrose et al. ......................... 417/48 |

OTHER PUBLICATIONS

Maslennikov, *Use of Nitrites to Obtain & Maintain a Very High Vacuum in a Thermonuclear Environment*, Inst. & Exp. Tech., #2, Mar.–Apr. 1970, pp. 529–533.

Primary Examiner—Peter A. Nelson
Attorney, Agent, or Firm—Oblon, Fisher, Spivak, McClelland & Maier

[57] ABSTRACT

A nuclear fuel element containing a hydrogen getter to prevent a cladding tube from being broken by hydrogen gas, wherein the hydrogen getter is formed of metal material capable of absorbing hydrogen and a metal member permeable to hydrogen and enclosing said hydrogen-absorbing metal.

3 Claims, 5 Drawing Figures

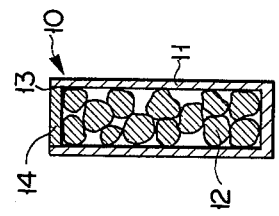
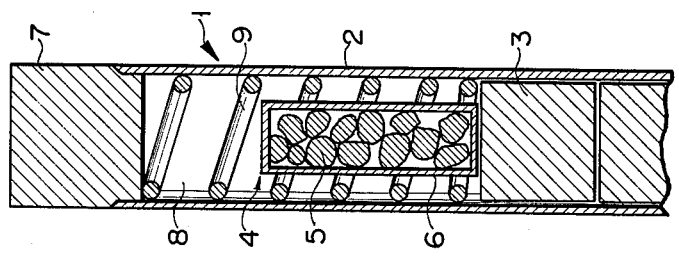
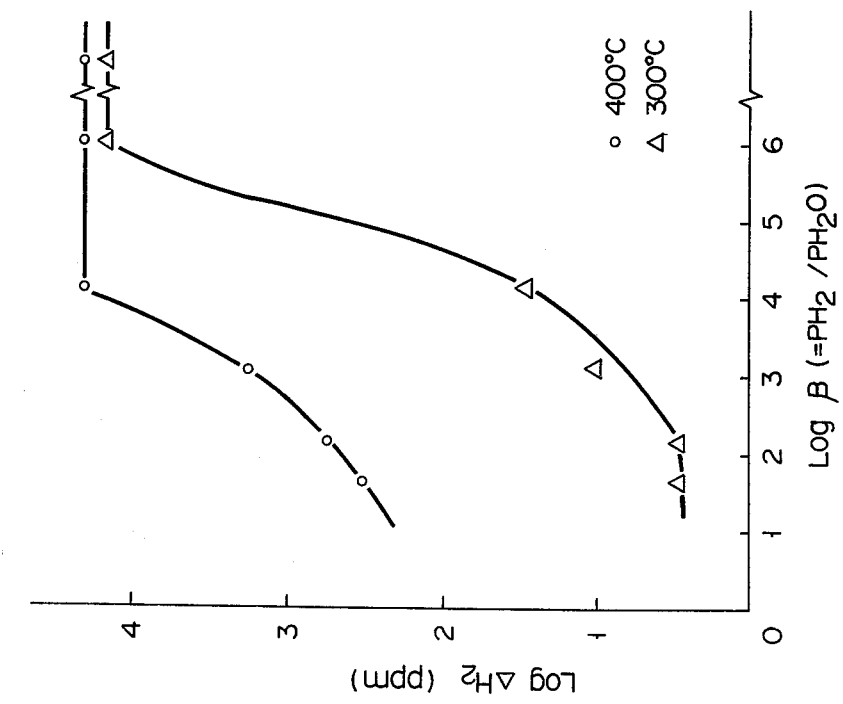

NUCLEAR FUEL ELEMENT

BACKGROUND OF THE INVENTION

This invention relates to a hydrogen getter capable of preventing a cladding tube from becoming brittle and being destroyed by hydrogen gas and also to a nuclear fuel element provided with said hydrogen getter.

A nuclear fuel element used with various types of nuclear reactor generally consists of fuel material sealed in a container or cladding tube made of corrosion-resistant, nonreactive and heat-conducting material. The cladding tube is customarily formed of stainless steel, aluminium or alloys thereof, or zirconium or alloys thereof. However, a cladding tube constructed of, for example, zirconium or alloys thereof sometimes tends to get locally hydrogenated and brittle by hydrogen gas evolving from various sources in the cladding tube during the run of a nuclear reactor and be destroyed by the resultant increase in a pressure difference originally occuring inside and outside of the cladding tube.

A nuclear fuel element used with, for example, a light-water type power reactor is constructed by packing a zircalloy cladding tube with pellets of uranium dioxide as fuel material and sealing helium gas in said cladding tube. The uranium dioxide pellets generally contain hydrogen and remnants of hydrogen atom-carrying organic compounds, for example, metal salts of stearic acid used as a binder. All these contaminants are generally liable to be brought into said pellets while they are prepared. Further, water particles tend to be adsorbed to the surface of the uranium dioxide pellets or the inner wall of the cladding tube. Consequently, hydrogen gas, water vapor and hydrocarbon gas are generated in the tightly closed nuclear fuel element while a nuclear reactor is operated. Water vapor and hydrocarbon gas often release hydrogen by reaction with the cladding tube and uranium dioxide pellets. No serious problems arise, as long as atmosphere in the nuclear fuel element containing the above-mentioned gasseous mixture is of the oxidizing type. Where, however, said atmosphere is turned into the reducing type due to increased amounts of released hydrogen, then the zircalloy cladding tube is rapidly hydrogenated and becomes brittle. FIG. 1 sets forth the measured hydrogen-absorbing property of zircalloy in an atmosphere (1 atmospheric pressure) consisting of a water vapor-hydrogen mixture with the proportions of both gases varied during experiments. In FIG. 1, a ratio of the partial pressure of hydrogen to that of water vapor is plotted on the abscissa, and an amount of hydrogen absorbed in 6 hours after the start of the experiment is plotted on the ordinate, both plottings being given in terms of log graduations. As apparent from FIG. 1, the more prominent the reducing tendency of the atomsphere, and the higher the atmosphere temperature, the larger the amount of hydrogen absorbed by zircalloy, resulting in the more accelerated brittleness thereof. It will therefore be easily understood that a nuclear fuel element is quickly hydrogenated in a high temperature reducing atmosphere easily produced in the cladding tube during the run of a nuclear reactor.

As already known, a hydrogen getter alloy for absorbing hydrogen gas and water vapor has been used to prevent the cladding tube from being hydrogenated and becoming brittle by hydrogen gas. A hydrogen getter alloy known to-date is, for example, a nickel-titanium-zirconium hydrogen getter alloy (hereinafter referred to as a "Ni-Ti-Zr getter alloy") marketed by General Electric Company, U.S.A. This Ni-Ti-Zr getter alloy is formed of about 3 to 12 wt% of nickel, about 3 to 30 wt% of titanium and zirconium as the remainder. However, this type of hydrogen getter alloy has the drawback that the alloy material reacts with water vapor in the hydrogen-water vapor atmosphere to have the surface coated with a protective film, resulting in a decline in the hydrogen-absorbing capacity of said getter alloy. Generally, vapors are actually evolved from the water adsorbed to the surface of uranium dioxide pellets and the inner wall of a cladding tube ahead of hydrogen gas, causing a getter alloy to absorb water and have the surface coated with a protective film due to reaction between both materials. As the result, the getter alloy not only decreases in the hydrogen-absorbing capacity, but also renders the atmosphere of the cladding tube more of the reducing type, thereby giving rise to the danger of the cladding tube itself being hydrogenated.

Another hydrogen-removing process already applied is to weld an end plug to a cladding tube, seal helium gas in the cladding tube after evacuating it and dry off absorbed water by applying high temperature during the evacuation. However, this process still has the drawbacks that the cladding tube has to be quickly sealed after drying; the sealed atmosphere of the cladding tube is rendered more of the reducing type due to the subsequent generation of various gases in the cladding tube, failing to minimize the danger of said cladding tube being again hydrogenated; and in consequence said prior art process is unadapted for permanent applicability.

SUMMARY OF THE INVENTION

It is accordingly the object of this invention to provide a hydrogen getter adapted to absorb hydrogen alone in the atmosphere of a cladding tube containing both hydrogen and water vapor and a nuclear fuel element equipped with said hydrogen getter.

A hydrogen getter according to this invention used with a nuclear fuel element is prepared by enclosing metal material capable of absorbing hydrogen in a metal member permeable to hydrogen and baking the metal assembly at high temperature.

BRIEF DESCRIPTION OF THE DRAWING

FIG. 1 shows the hydrogen-absorbing property of zircalloy in a water vapor-hydrogen atmosphere maintained at 1 atompsheric pressure;

FIG. 2 is a fractional longitudinal sectional view of a concrete nuclear fuel element according to this invention;

FIG. 3 is a longitudinal sectional view of a concrete hydrogen getter according to the invention;

DETAILED DESCRIPTION OF THE PREFERRED EMBODIMENTS

Figure 4:
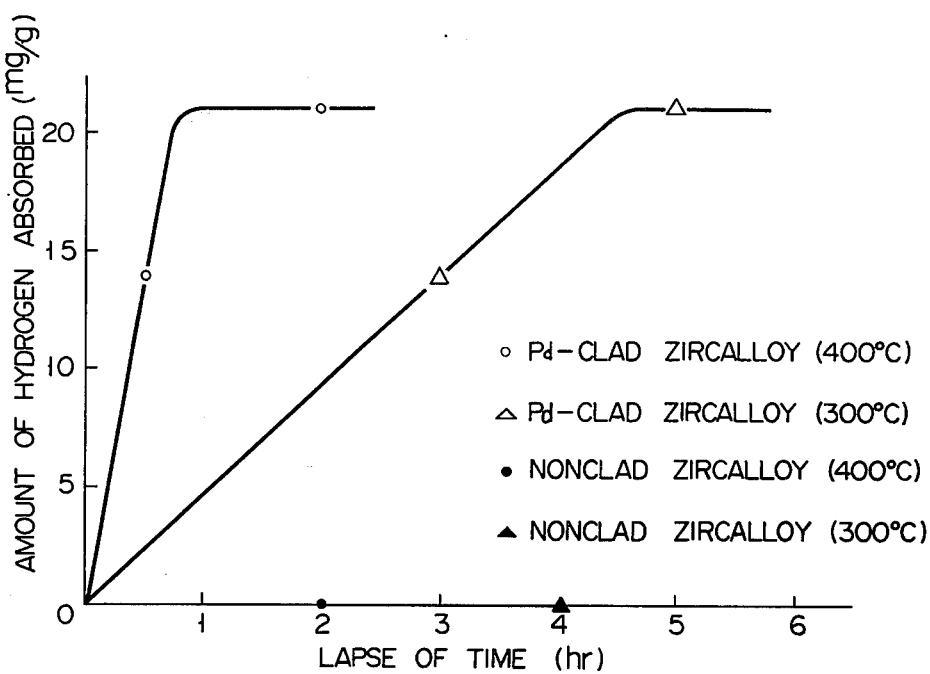
FIG. 4 is a graph comparing the hydrogen-absorbing capacity of a zircalloy clad with palladium and that of a zircalloy hydrogen getter alloy not clad with palladium.

Hydrogen-absorbing metal material used in a state sealed in a nuclear fuel element according to this invention includes zirconium and alloys thereof such as zircalloy, and titanium and alloys thereof, or preferably zirconium, zircalloy and the aforesaid Ni-Ti-Zr getter alloy. As used herein, "absorption of hydrogen" is defined broadly to mean reaction with hydrogen to produce hydrogenated material.

A hydrogen-permeable metal member used to enclose the above-mentioned hydrogen-absorbing metal is formed of palladium, palladium alloys such as silver-palladium alloy, rhenium or preferably palladium or alloys thereof.

Said hydrogen-permeable metal member allows the passage of hydrogen alone but not water vapor, oxygen and other gases.

FIG. 2 presents a preferred concrete embodiment of a nuclear fuel element according to this invention. A nuclear fuel element 1 is constructed by packing a zircalloy cladding tube 2 with a large number of pellets 3 of uranium dioxide as fuel material and further loading said cladding tube 2 with a hydrogen getter 4 consisting of zirconium particles 5 enclosed in an evacuated palladium tube 6. FIG. 2 only shown the upper portion of the nuclear fuel element 1, wherein the cladding tube 2 is tightly sealed with an end plug 7, and a spring 9 is inserted into a plenum 8 securely to set the uranium dioxide pellets 3 in place.

FIG. 3 is a hydrogen getter 10 according to another embodiment of this invention, wherein zircalloy particles 12 are received in a blind metal tube 11 and the opening 13 of said tube is sealed in vacuum with a palladium plug 14.

The process of enclosing hydrogen-absorbing metal material in a hydrogen-permeable metal member may be carried out either by sealing a certain amount of the hydrogen-absorbing metal material in the hydrogen-permeable metal member in vacuum by means of, for example, electron beams or by vacuum evaporating or electroplating a hydrogen-permeable metal film on individual hydrogen-absorbing metal particles. The hydrogene absorbing metal material is preferred to be formed of particles about 1 to 2 mm in diameter for quick absorption of hydrogen, that is, to provide a large contact area between the metal mateial and hydrogen.

Hydrogen-absorbing metal material such as zirconium, titanium or alloys thereof has the surface coated with a protective film when exposed to air or water vapor and ceases to absorb hydrogen at lower temperature than 400° C. According to this invention, therefore, particles of hydrogen-absorbing metal material such as zirconium are enclosed in a hydrogen-permeable metal member of, for example, palladium. Thereafter the metal assembly is baked at high temperature before fitted into a nuclear fuel element. It is preferred that said baking be carried out in vacuum at higher temperature than 600° C for about 1 to 3 hours or more preferably at about 700° C for about 1 hour. This baking causes a protective film possibly formed up to this point on the hydrogen-absorbing metal particles due to reaction with water vapor to disappear quickly. Since hydrogen-absorbing metal particles are enclosed in a hydrogen-permeable metal member, any other gas than hydrogen does not enter said hydrogen-permeable metal member, eliminating the possibility of the above-mentioned protective film being again formed on the hydrogen-absorbing metal material. Thus the hydrogen getter of this invention displays a more prominent capacity of absorbing hydrogen than the prior art hydrogen getter formed of a single element.

The following experiments were carried out to compare the effect of the hydrogen getter of this invention and that of the conventional hydrogen getter. Measurement was made of an amount (mg) of hydrogen absorbed per gram of zircalloy perticles enclosed in a hydrogen-permeable palladium member and these not enclosed therein an atmosphere consisting of hydrogen having a partial pressure of 760 mm Hg and water vapor having a partial pressure of 14 mmHg at 300° C.

Throughout the experiments, the zircalloy had a composition of 98.357% of zirconium (Zr), 1.500% of tin (Sn), 0.112% of iron (Fe), 0.001% of nickel (Ni) and 0.030% of chronium (Cr). As apparent from FIG. 4 showing the results of experiments, zircalloy particles not enclosed in a hydrogen-permeable metal member substantially failed to absorb hydrogen due to a protective film being formed on said particles. In contrast, zircalloy particles of this invention which are covered with said hydrogen-permeable metal element efficiently absorbed hydrogen until the zirconium is converted into zirconium dihydride.

Figure 5:
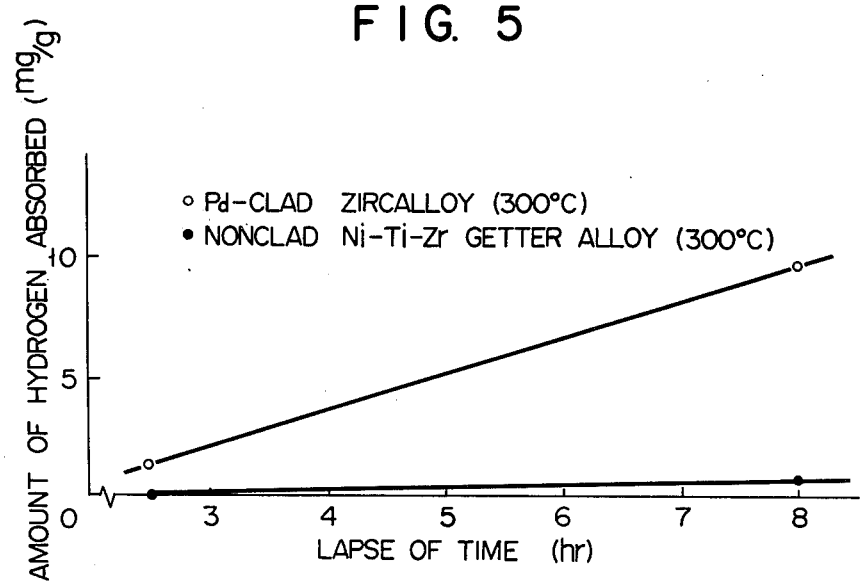
FIG. 5 is a graph comparing the hydrogen-absorbing capacity of a palladium-clad zircalloy and a Ni-Ti-Zr getter alloy not clad with palladium.

Further, measurement was made of an amount (mg) of hydrogen absorbed per gram of a zircalloy hydrogen getter of this invention enclosed in a hydrogen-permeable palladium member and the Ni-Ti-Zr getter alloy not enclosed in any hydrogen-permeable metal member in an atmosphere at 300° C consisting of hydrogen having a partial pressure of 15 mmHg and water vapor having a partial pressure of 15 mmHg. The Ni-Ti-Zr getter alloy used had a composition of 84.42% of zirconium (Zr), 8.70% of Titanium (Ti) and 6.88% of nickel (Ni). FIG. 5 giving the results of experiments proves that the hydrogen getter of this invention exclusively absorbed hydrogen even in the above-mentioned oxidizing atmosphere, whereas the Ni-Ti-Zr getter alloy not enclosed in any hydrogen-permeable metal member absorbed only an extremely small amount of hydrogen. This undesirable event is supposed to result from a protective film deposited on the surface of the Ni-Ti-Zr getter alloy not enclosed in a hydrogen-permeable metal member.

A nuclear fuel element according to this invention provided with the above-mentioned hydrogen getter enclosed in a hydrogen-permeable metal member has been found little liable to be hydrogenated and become brittle with the possibility of being eventually destroyed during the run of a nuclear reactor.

What we claim is:

1. In a nuclear fuel element constructed by sealing nuclear fuel material in a cladding tube, the improvement which comprises a hydrogen getter formed of hydrogen-absorbing metal material enclosed in a hydrogen-permeable metal member which does not allow the passage of water, oxygen and other gases fitted into the cladding tube, whereby the hydrogen-absorbing metal material is prevented from having the surface coated with a protective film.

2. A nuclear fuel element according to claim 1, wherein the hydrogen-absorbing metal material is one selected from a group consisting of zirconium, titanium and alloys thereof.

3. A nuclear fuel element according to claim 1, wherein the metal permeable to hydrogen is one selected from a group consisting of palladium, alloys thereof and rhenium.

* * * * *